United States Patent
Lu

(10) Patent No.: US 9,621,231 B2
(45) Date of Patent: Apr. 11, 2017

(54) SYSTEM, AN APPARATUS, A DEVICE, A COMPUTER PROGRAM AND A METHOD FOR DEVICE WITH SHORT RANGE COMMUNICATION CAPABILITIES

(75) Inventor: Wenhui Lu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 14/241,060

(22) PCT Filed: Sep. 14, 2011

(86) PCT No.: PCT/FI2011/050786
§ 371 (c)(1),
(2), (4) Date: Apr. 30, 2014

(87) PCT Pub. No.: WO2013/038047
PCT Pub. Date: Mar. 21, 2013

(65) Prior Publication Data
US 2014/0315487 A1    Oct. 23, 2014

(51) Int. Cl.
*H04W 76/02*   (2009.01)
*H04W 28/18*   (2009.01)
(Continued)

(52) U.S. Cl.
CPC ............. *H04B 5/02* (2013.01); *H04W 84/18* (2013.01); *H04L 45/24* (2013.01); *H04W 76/023* (2013.01)

(58) Field of Classification Search
CPC ...................................... H04B 5/00
See application file for complete search history.

(56) References Cited

U.S. PATENT DOCUMENTS 7,149,529 B2    12/2006  Parry
2004/0131007 A1*  7/2004  Smee et al. .......... H04B 7/0669
                                                    370/208
(Continued)

FOREIGN PATENT DOCUMENTS

GB          2452020 A      2/2009

OTHER PUBLICATIONS

"Apple Invents New Peer-to-Peer Sharing Technology that Utilizes Unique Magnetic Compass and Supersonic Tone Methodologies", Patently Apple, Retrieved on Jun. 30, 2015, Webpage available at : http://www.patentlyapple.com/patently-apple/2011/04/apple-invents-new-peer-to-peer-sharing-technology-that-utilizes-unique-magnetic-compass-and-supersonic-tone-methodolo.html.
(Continued)

*Primary Examiner* — Cindy Trandai
(74) *Attorney, Agent, or Firm* — Alston & Bird LLP

(57) ABSTRACT

The invention relates to a method, a system, an apparatus and a computer program. The system comprises an apparatus and at least two devices. Yet further, the system comprises setting means configured to set a first short range communication path between the apparatus and one of at least two devices, which first short range communication path is used for delivering a first pairing information enabling a connection between at least two devices. The setting means are also configured to set a second short range communication path between the apparatus and at least one other of said at least two devices, which second short range communication path is used for delivering a second pairing information enabling a connection between at least two devices. The system comprises also connecting means configured to form the connection between at least two devices by means of the first and second pairing information.

20 Claims, 10 Drawing Sheets

(51) Int. Cl.
  H04B 5/02 (2006.01)
  H04W 84/18 (2009.01)
  H04L 12/707 (2013.01)

(56) References Cited

U.S. PATENT DOCUMENTS

| | | |
|---|---|---|
| 2004/0266449 A1 | 12/2004 | Smetters et al. |
| 2005/0090294 A1* | 4/2005 | Narasimhan ............ H04L 29/06 455/575.1 |
| 2005/0101334 A1 | 5/2005 | Brown et al. |
| 2006/0046706 A1 | 3/2006 | Lin et al. |
| 2006/0083187 A1* | 4/2006 | Dekel ................ H04L 63/0853 370/310 |
| 2006/0101280 A1 | 5/2006 | Sakai |
| 2007/0076649 A1* | 4/2007 | Lin ..................... H04W 76/025 370/328 |
| 2007/0211714 A1 | 9/2007 | Metke et al. |
| 2007/0214283 A1* | 9/2007 | Metke ............... H04L 29/12066 709/245 |
| 2008/0113781 A1* | 5/2008 | Soltys ................ G07F 17/3244 463/28 |
| 2008/0186145 A1 | 8/2008 | Manley et al. |
| 2008/0252477 A1* | 10/2008 | Howard ............. H01M 10/488 340/693.1 |
| 2008/0280559 A1 | 11/2008 | Dandekar et al. |
| 2009/0111378 A1* | 4/2009 | Sheynman ........... H04W 8/005 455/41.1 |
| 2009/0222659 A1 | 9/2009 | Miyabayashi et al. |
| 2010/0075666 A1* | 3/2010 | Garner ................ H04M 1/7253 455/426.1 |
| 2010/0093278 A1 | 4/2010 | Abel et al. |
| 2010/0103858 A1* | 4/2010 | Palanki .............. H04B 7/15507 370/315 |
| 2010/0221999 A1 | 9/2010 | Braun et al. |
| 2011/0021150 A1 | 1/2011 | Lin |
| 2011/0028136 A1 | 2/2011 | Frazier et al. |
| 2011/0076948 A1* | 3/2011 | Jabara ................. H04L 12/5692 455/41.2 |
| 2011/0183632 A1* | 7/2011 | Suumaki ........... H04W 72/1231 455/77 |
| 2012/0023167 A1* | 1/2012 | Hovdal ................ G06K 7/1095 709/204 |
| 2012/0100803 A1* | 4/2012 | Suumaki ........... H04W 36/0072 455/41.1 |
| 2012/0265913 A1* | 10/2012 | Suumaki ............... H04W 4/008 710/303 |

OTHER PUBLICATIONS

Extended European Search Report received for corresponding European Patent Application No. 11872333.7, dated Jun. 3, 2015, 8 pages.
International Search Report and Written Opinion received for corresponding Patent Cooperation Treaty Application No. PCT/FI2011/050786, dated Jun. 5, 2012, 12 pages.
Office Action for European Application No. EP 11 872 333.7 dated Nov. 8, 2016.

* cited by examiner

SYSTEM, AN APPARATUS, A DEVICE, A COMPUTER PROGRAM AND A METHOD FOR DEVICE WITH SHORT RANGE COMMUNICATION CAPABILITIES

RELATED APPLICATION

This application was originally filed as Patent Cooperation Treaty Application No. PCT/FI2011/050786 filed Sep. 14, 2011.

TECHNICAL FIELD

Various embodiments relate to apparatuses having short range communication capabilities.

BACKGROUND

Near field communication relates to a set of short-range wireless technologies allowing data exchange and connection for simplified transactions.

In order to perform near field communication, one of the devices being involved should have an initiator capability, and one of the devices being involved should have a target capability. These devices perform pairing so that a data exchange between said devices can be carried out.

SUMMARY

Now there has been invented an improved method and technical equipment implementing the method to expand the pairing possibilities so that e.g. pairing of two target devices becomes possible, but also that a near field communication technique can be utilized for setting up other short-range connections. In addition to such an example, also other variations are enabled where a mobile device is used for performing pairing of two devices. Various aspects of the invention include a method, a system, an apparatus, a device and a computer program, which are characterized by what is stated in the independent claims. Various embodiments of the invention are disclosed in the dependent claims.

According to a first aspect there is provided a method comprising setting a first short range communication path between an apparatus and one of at least two devices, which first short range communication path is used for delivering a first pairing information enabling a connection between said at least two devices; setting a second short range communication path between the apparatus and at least one other of said at least two devices, which second short range communication path is used for delivering a second pairing information enabling a connection between said at least two devices; wherein said first and second pairing information is used for setting the connection between said at least two devices.

According to a second aspect there is provided a system comprising an apparatus; at least two devices; setting means configured to set a first short range communication path between the apparatus and one of at least two devices, which first short range communication path is used for delivering a first pairing information enabling a connection between said at least two devices; said setting means being configured to set a second short range communication path between said apparatus and at least one other of said at least two devices, which second short range communication path is used for delivering a second pairing information enabling a connection between said at least two devices; connecting means configured to use said first and second pairing information for setting the connection between said at least two devices.

According to a third aspect there is provided an apparatus comprising at least one processor, memory including computer program code, the memory and the computer program code configured to, with the at least one processor, cause the apparatus to at least set a first short range communication path between the apparatus and one of at least two devices, which first short range communication path is used for delivering a first pairing information enabling a connection between said at least two devices; set a second short range communication path between said apparatus and at least one other of said at least two devices, which second short range communication path is used for delivering a second pairing information enabling a connection between said at least two devices.

According to a fourth aspect there is provided device being configured to have a short range communication path to an apparatus for receiving a pairing information enabling a connection to another device and to use said pairing information for setting up a connection to said another device.

According to a fifth aspect there is provided a computer program embodied on a non-transitory computer readable medium, the computer program comprising instructions causing, when executed on at least one processor, at least one apparatus to: set a first short range communication path between the apparatus and one of at least two devices, which first short range communication path is used for delivering a first pairing information enabling a connection between said at least two devices; set a second short range communication path between said apparatus and at least one other of said at least two devices, which second short range communication path is used for delivering a second pairing information enabling a connection between said at least two devices; wherein the instructions are configured to further cause the apparatus to use said first and second pairing information for setting the connection between said at least two devices.

According to a sixth aspect, there is provided an apparatus comprising setting means configured to set a first short range communication path between the apparatus and one of at least two devices, which first short range communication path is used for delivering a first pairing information enabling a connection between said at least two devices; said setting means being configured to set a second short range communication path between said apparatus and at least one other of said at least two devices, which second short range communication path is used for delivering a second pairing information enabling a connection between said at least two devices.

In the above aspects, various combinations of the embodiments are possible.

DESCRIPTION OF THE DRAWINGS

In the following, various embodiments of the invention will be described in more detail with reference to the appended drawings, in which.

DETAILED DESCRIPTION OF SOME EMBODIMENTS

In the following, several embodiments of the invention will be described in the context of near field communication (NFC). Near field communication relates to a set of short-range wireless technologies allowing data exchange and connection for simplified transactions. For example, NFC device may contain an embedded NFC chip that is capable of sending encrypted data to a reader being located at a short distance (less than 5 centimeters, but sometimes even more) from the NFC device.

In order to set up a near field communication, the devices participating to NFC are configured to act as an initiator (I) and a target (T) or their combination. In active communication, both devices may generate their own radio frequency field and act both as initiators and targets, but in passive communication one of the devices is configured to generate the radio frequency field and the others may power themselves with the field. Such a passive device having no power of its own is called as an NFC transponder. When one of such is used, the user may bring an NFC enabled device to approach the transponder, whereby a small amount of power can be taken by the NFC transponder from the initiator to power the transponder electronics. Approaching may refer to touching the transponder with the NFC enabled device or bringing the NFC enabled device into close proximity with the transponder. The transponder is then enabled to transfer a small amount of information to the initiator. The transponder's tag may contain data and is typically read-only. Some tags can also be rewriteable. The tags can be custom-encoded and they can store personal data such as debit and credit card information, personal identification numbers, networking contacts and other information.

In addition to the near field communication, devices may have other connections formed therein between for data exchange. Bluetooth and WiFi are given as examples. In order to use Bluetooth, the devices need to share pairing information for establishing the connection. The pairing information can be in the form of a password.

Figure 1:
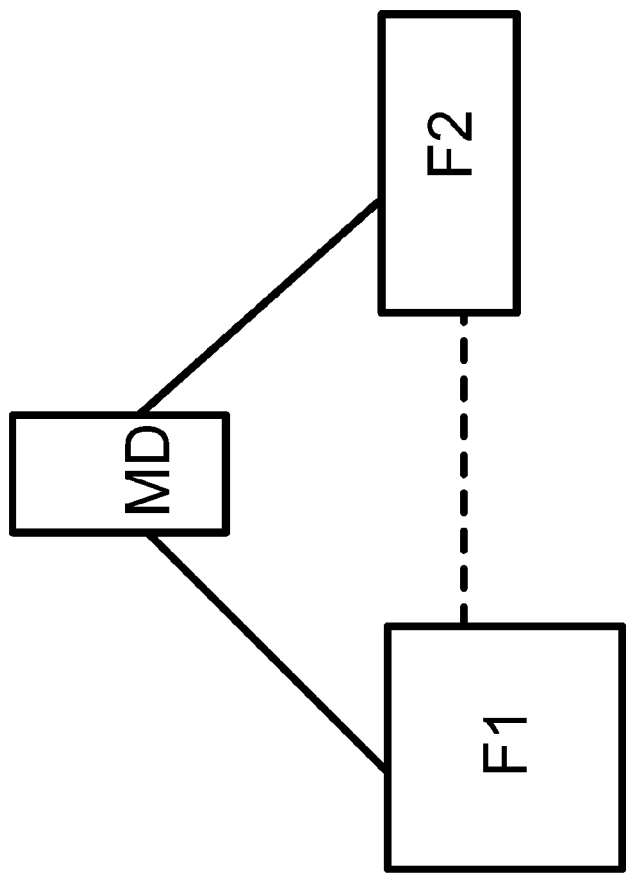
FIG. 1 illustrates a simple example of how a mobile device can be used for pairing of two stationary devices.

FIG. 1 illustrates a simplified example for an embodiment of the present solution. In FIG. 1 an apparatus, such as a mobile device (MD), is configured to control the pairing of at least two devices (F1, F2). The connection being established as a result of pairing can be a Bluetooth connection or any other data transfer connection that needs a set-up procedure in the form of sharing pairing information. As an example, a person may have a personal computer that needs to connected to a printer being located nearby, for example 10 meters from the personal computer. For performing the connection, the person may use her/his mobile device according to embodiments being disclosed in this application. Both the personal computer and the printer are examples of the devices that can be paired by means of a mobile device. The devices can be fixed or stationary by their nature. The pairing configuration can be time based and token expiration can be customized according to a specific use case. The stationary device's capability needs to be taken into consideration when setting the time. For example, devices with restricted power capacity may have shorter time window than devices with great power capacity. In the following, embodiments for controlling and performing pairing of at least two devices with help of an apparatus, such as a mobile device, are disclosed with help of FIGS. 2-7.

Figure 2:
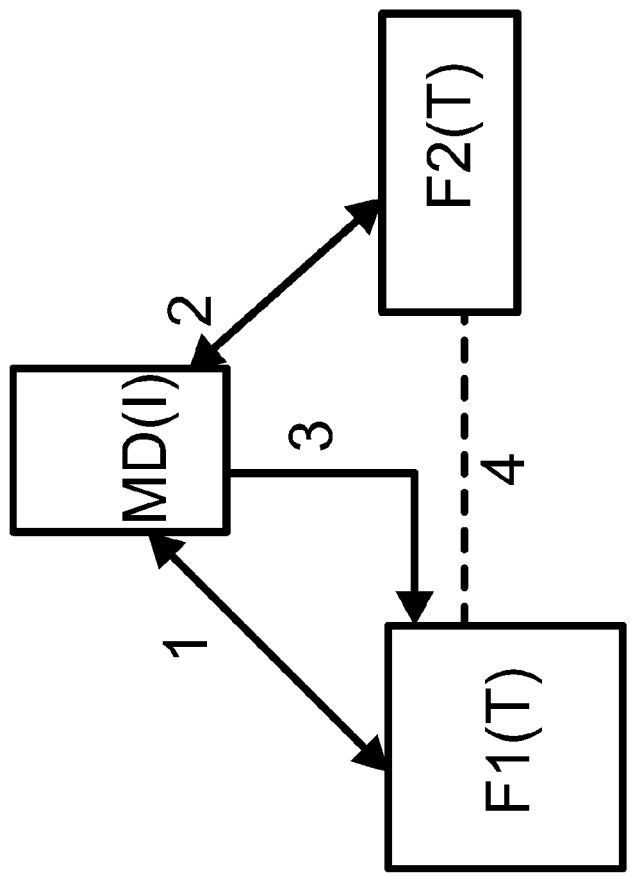
FIG. 2 illustrates a first embodiment for pairing.

In the first embodiment, shown on FIG. 2, the mobile device (MD) is given as an example of an apparatus. The mobile device (MD) acts as an initiator (I), and the two stationary devices (F1, F2) are targets (T). Therefore mobile device (MD) and the stationary devices (F1, F2) are configured to have a passive connectivity capability to each others. In addition, both of the stationary devices (F1, F2) are configured to have a connectivity capability to the other stationary device (F1, F2). The connectivity capability between the mobile device (MD) and the stationary devices (F1, F2) can be near field communication capability. The connectivity capability between the first and the second stationary devices can be Bluetooth communication capability or some other communication capability for data transfer. In addition, the stationary devices (F1, F2) are configured to store a tag holding uniform resource identifier of the stationary device (F1, F2) in question. The tag is used for enabling the pairing with another stationary device. More detailed characteristics of the tag depends on the type of the communication capability between the stationary devices.

Figure 6:
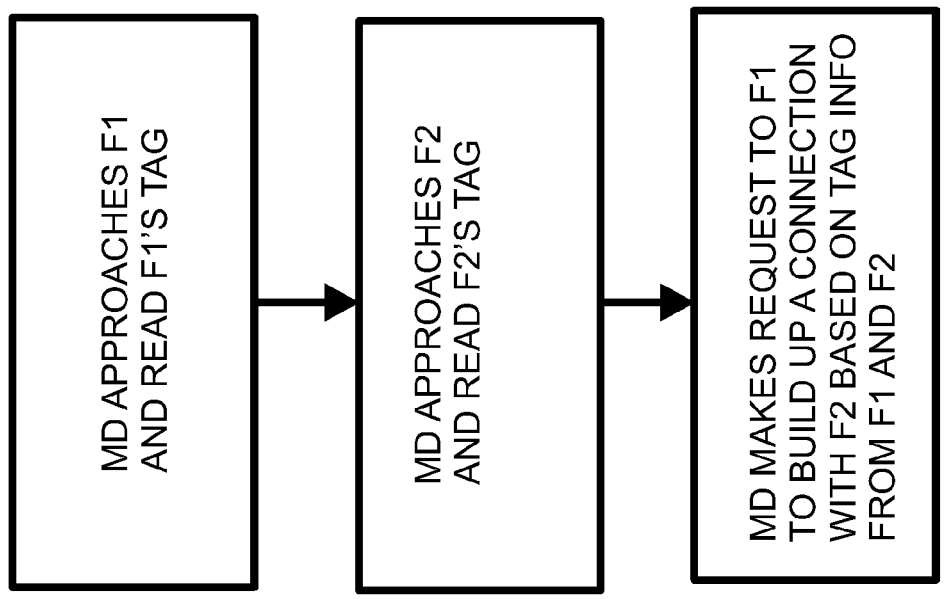
FIG. 6 illustrates a flowchart for the first embodiment.

In order to perform the pairing according to FIG. 2, the mobile device (MD) is capable of approaching (1) the first stationary device (F1) and reading (1) a tag of said first stationary device (F1). Thereafter, the mobile device (MD) is capable of approaching (2) the second stationary device (F2) and read (2) a tag of said second stationary device (F2). It is appreciated that the mobile device can also be capable of approaching the second stationary device (F2) at first, and then the first stationary device (F1). It is also appreciated that it is not necessary to read both first and second stationary devices' tags by the mobile device. If mobile device (MD) first reads the first stationary device's (F1) tag, then the mobile device (MD) can request the second stationary device (F2) to connect to the first stationary device (F1). However, this kind of procedure is based on an assumption that the second fixed device (F2) is already connected to mobile device beforehand. After reading both tags, the mobile device is configured to make (3) a request to the first stationary device (F1) to build up (4) a connection with the second stationary device (F2) based on the tag information of said stationary devices (F1, F2). In other words, the mobile device is configured to control the pairing of the two stationary devices by sharing the tag of the second stationary device (F2) with the first stationary device (F1), whereby a communication path between the devices can be established. The embodiment of FIG. 2 is also illustrated in FIG. 6.

The first embodiment, shown in FIG. 2, is suitable also for combinations, where 1) the mobile device acts as an initiator and the first and the second stationary devices act as targets (I-T-T); 2) the mobile device acts as an initiator and a target and the first and the second stationary devices act as targets (IT-T-T); 3) the mobile device acts as an initiator and the first stationary device acts as an initiator and a target and the second stationary device acts as a target (I-IT-T); 4) the mobile device acts as an initiator, and the first and the second devices act as initiators and targets (I-IT-IT); 5) the mobile device and the first stationary device act as initiators and targets, and the second stationary device acts a target (IT-IT-T); 6) the mobile device, the first stationary device and the second stationary device act as initiators and targets (IT-IT-IT).

Figure 3:
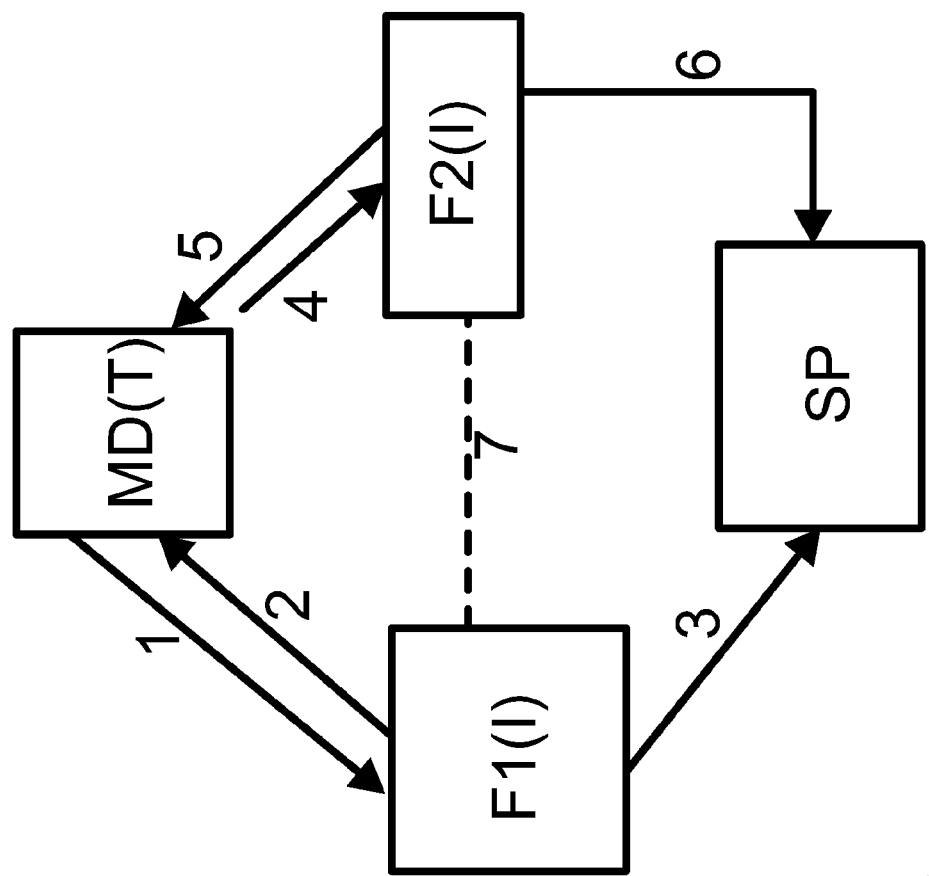
FIG. 3 illustrates a second embodiment for pairing.

In the second embodiment, shown in FIG. 3, the apparatus may act as a target (T), and is configured to store tag information as an identifier. The apparatus may be a mobile device (MD) as in the previous example, but also a tag or a tool comprising a tag may represent the apparatus. The tag information may comprise data that indicates the apparatus' role as a matchmaker. The tag may comprise an uniform resource identifier that directs to a third party service provider (SP). The uniform resource identifier may point to a real device or to device's virtual portal for connection configuration (i.e. configuration file). The tag may also comprise some other information that can be used for directing towards the third party service provider. It is appreciated that this kind of a tag also enables the pairing of the stationary devices (F1, F2). The stationary devices (F1, F2) act as initiators (I) having connectivity capability (e.g. Bluetooth) to the other stationary device (F1, F2) as well as a connectivity capability to access the third party service provider (SP). The third party service provider (SP) may maintain pairing information that is linked to the uniform resource identifier on mobile device's (MD) tag.

For performing the pairing, the mobile device (MD) is configured to approach (1) the first stationary device (F1) through a near field communication path, whereby the first stationary device (F1) is capable of reading (2) mobile device's (MD) tag. The first device (F1) is capable of filling (3) its own connectivity information to a service portal of the third party service provider (SP) that is linked to the uniform resource identifier appearing on mobile device's (MD) tag. Then the first stationary device (F1) is configured to check whether the pairing partner information is being input to said service portal, and if so, the first stationary device (F1) can start the connection.

Figure 7:
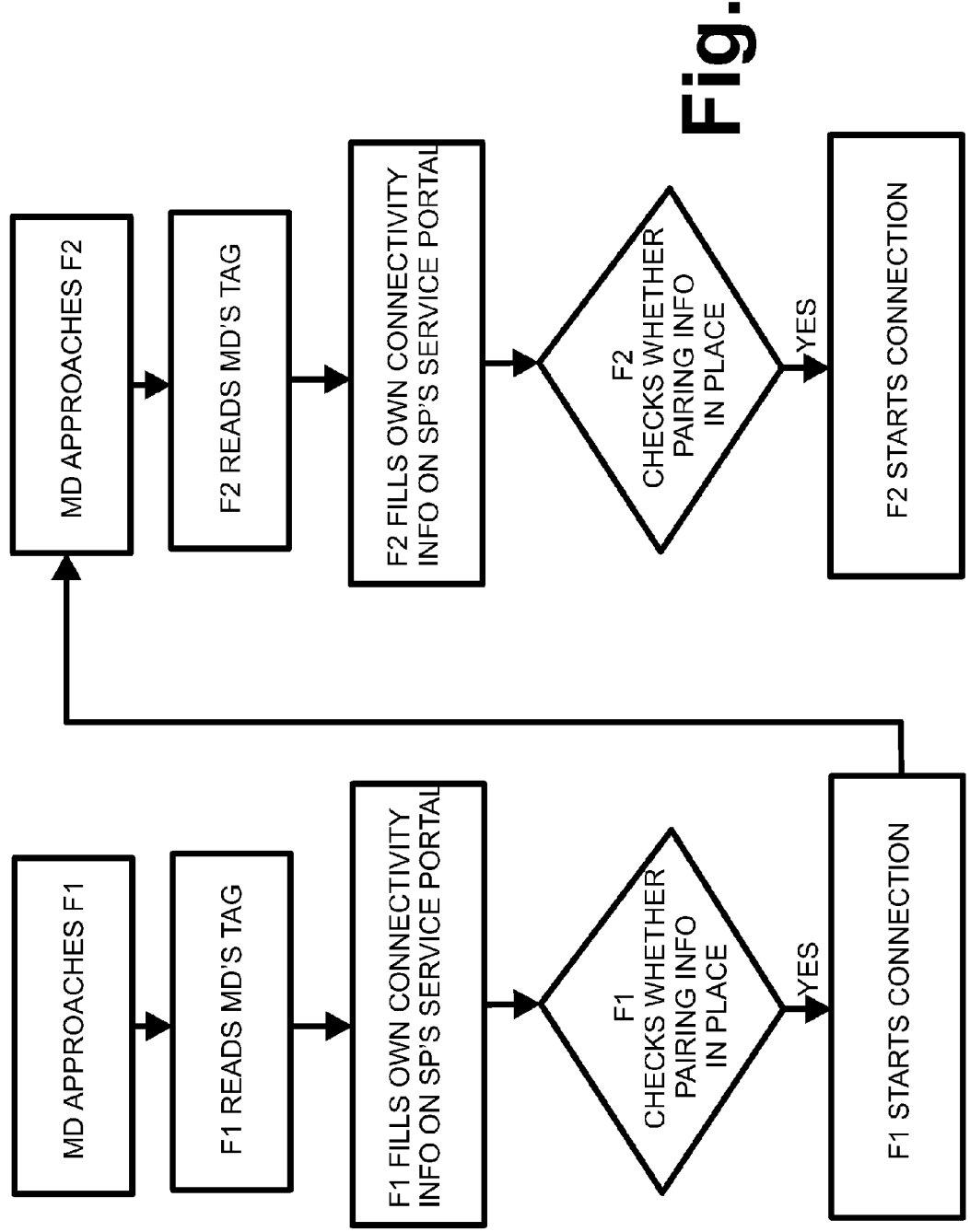
FIG. 7 illustrates a flowchart for the second embodiment.

Similarly, the mobile device (MD) is configured to approach (4) the second stationary device (F2) through a near field communication path to allow the second stationary device (F2) to read (5) the mobile device's (MD) tag. After this, the second stationary device (F2) is able to fill (6) its own connectivity information to the service portal of the third party service provider (SP) being indicated by the uniform resource identifier of the mobile device's (MD) tag. Then the second stationary device (F2) is configured to check whether the pairing partner information is input to said service portal and is in place, and if so, the second stationary device (F2) can start the connection (7). In this embodiment, the mobile device is configured to direct the stationary devices (F1, F2) to a third service provider by means of an information being stored in mobile device's tag. The stationary devices (F1, F2) then will pair directly through the third party service provider. The procedure according to FIG. 3 is also illustrated in FIG. 7.

As another example of the second embodiment, there is no need for third party service provider. For example, if mobile device's (MD) tag can be modified, without informing the mobile device (MD), then at the time the mobile device (MD) approaches the first stationary device (F1), the first stationary device (F1) writes the first stationary device's (F1) connectivity information into mobile device's (MD) tag. Then when the mobile device (MD) approaches the second stationary device (F2), the second stationary device (F2) reads the mobile device's (MD) tag which contains the first stationary device's (F1) connectivity information. Then the second stationary device (F2) can initiate the connection request directly to the first stationary device (F1).

The second embodiment is also suitable for combinations, where 1) the mobile device acts as a target and the first and the second stationary devices act as initiators (T-I-I); 2) the mobile device acts as an initiator and a target and the first and the second stationary devices act as initiators (IT-I-I); 3) the mobile device acts as a target and the first stationary device acts as an initiator and a target and the second stationary device acts as an initiator (T-IT-I); 4) the mobile device acts as a target, and the first and the second devices act as initiators and targets (T-IT-IT); 5) the mobile device and the first stationary device act as initiators and targets, and the second stationary device acts an initiator (IT-IT-I); 6) the mobile device, the first stationary device and the second stationary device act as initiators and targets (IT-IT-IT).

Figure 4:
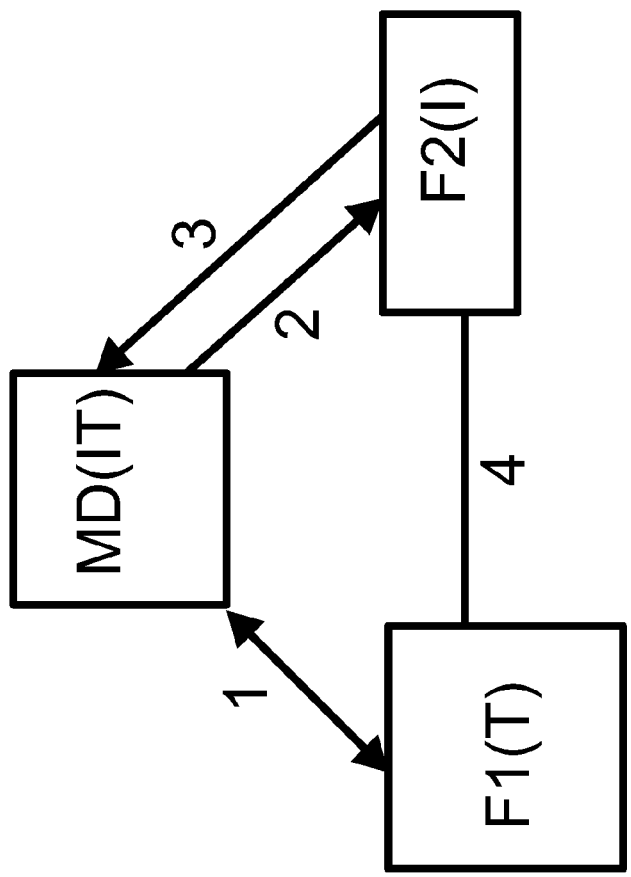
FIG. 4 illustrates a third embodiment for pairing.
Figure 8:
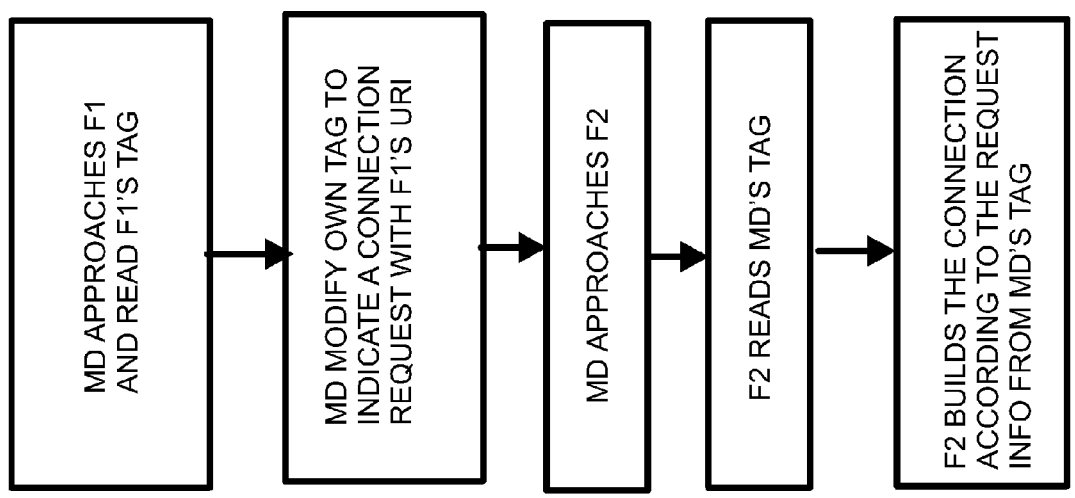
FIG. 8 illustrates a flowchart for the third embodiment.

In the third embodiment, shown in FIG. 4, the apparatus, such as a mobile device (MD), may act both as an initiator and a target (IT) and is capable of setting the tag. The first stationary device (F1) acts as a target (T), whereas the second stationary device (F2) acts as an initiator (I). Both stationary devices (F1, F2) have a connectivity capability (e.g. Bluetooth) to the other stationary device (F1, F2). In addition to this, the first stationary device (F1) (i.e. the target) has a tag storing a uniform resource identifier of the first stationary device (F1). In order to perform the pairing, the mobile device (MD) is configured to approach (1) the first stationary device (F1) through a near field communication path and to read (1) the tag of said first stationary device (F1). After this, the mobile device (MD) is configured to modify its own tag to indicate a connection request with the uniform resource identifier of the first stationary device (F1). It is realized, that also in this example, the tags are used for enabling the pairing of the stationary devices (F1, F2). The mobile device (MD) is then configured to approach (2) the second stationary device (F2) through a near field communication path, whereby the second stationary device (F2) is capable of reading (3) the tag of the mobile device (MD). According to the request information being stored on mobile device's (MD) tag, the second stationary device (F2) is capable of building (4) the connection to the first stationary device (F1). As in the first and the second embodiment, also in this embodiment, the mobile device is configured to share the tag which enables establishing a communication path between the stationary devices (F1, F2). This embodiment is also illustrated in FIG. 8.

The third embodiment is suitable also for combinations, where 1) the mobile device acts as an initiator and a target, and the first stationary device acts as a target, and the second stationary device acts as an initiator (IT-T-I); 2) the mobile device and the first stationary device act as initiators and targets, and the second stationary device acts an initiator (IT-IT-I); 3) the mobile device and the first stationary device act as initiators and targets, and the second stationary device acts as a target (IT-IT-T); 4) the mobile device, the first stationary device and the second stationary device act as initiators and targets (IT-IT-IT).

Figure 5:
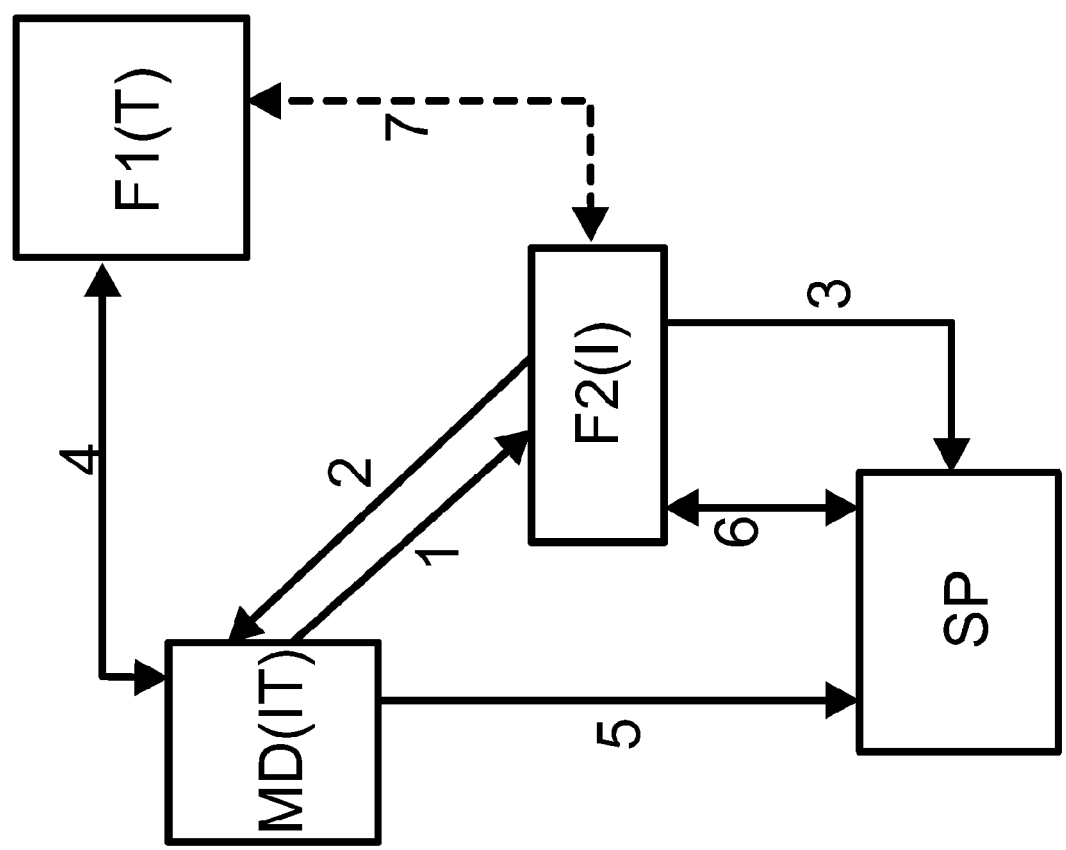
FIG. 5 illustrates a fourth embodiment for pairing.
Figure 9:
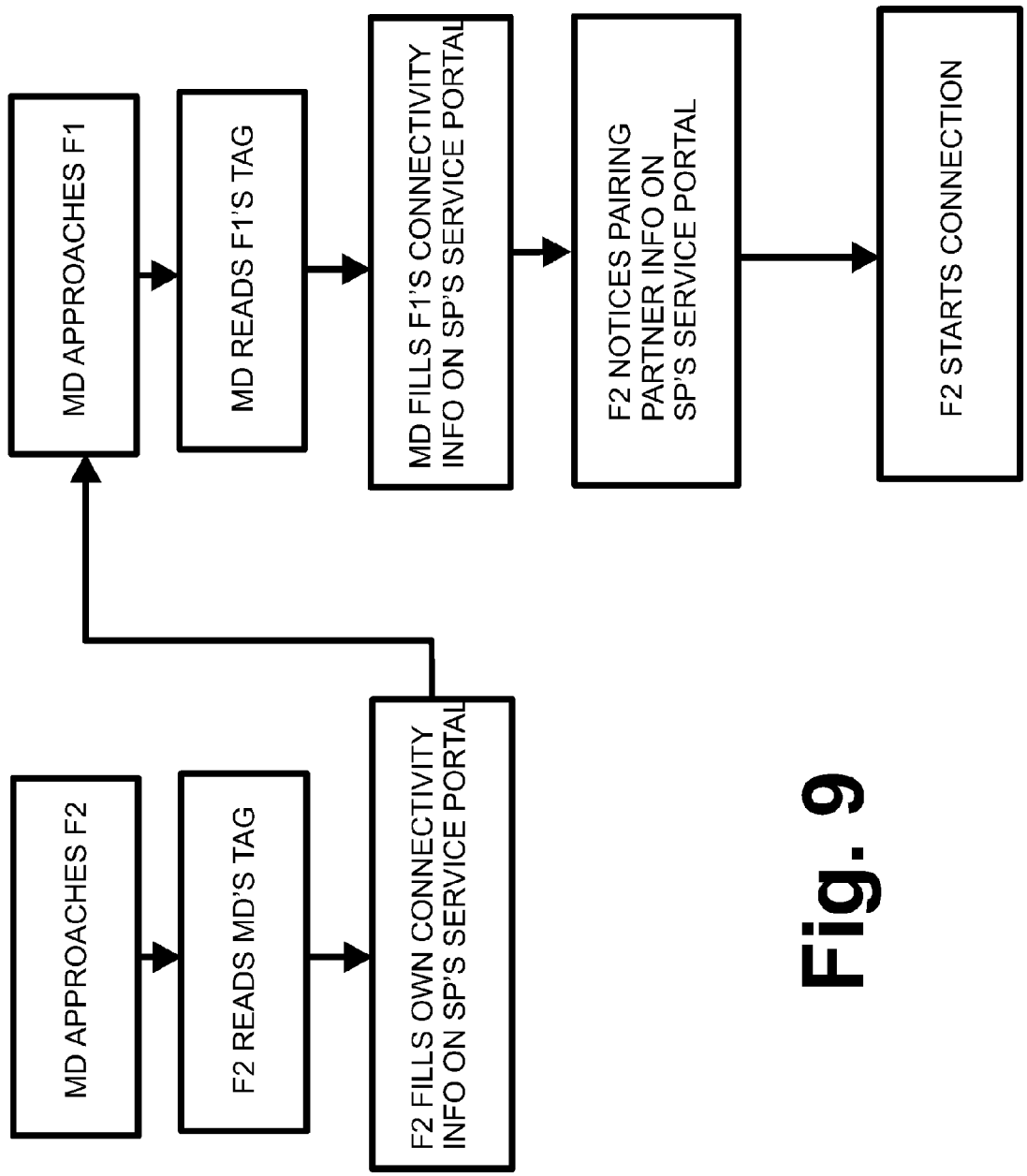
FIG. 9 illustrates a flowchart for the fourth embodiment.

In fourth embodiment, shown in FIG. 5, the apparatus, such as a mobile device (MD), again may act both as an initiator and a target (IT) and is capable of setting the tag. The first stationary device (F1) acts as a target (T), whereas the second stationary device (F2) acts as an initiator (I). Both stationary devices (F1, F2) have a connectivity capability (e.g. Bluetooth) to the other stationary device (F1, F2). In order to perform the pairing, the mobile device (MD) is configured to approach (1) the second stationary device (F2) through a near field communication path, whereby the second stationary device (F2) is capable of reading (2) mobile device's tag storing an uniform resource identifier to a third party service provider (SP). The second stationary device (F2) is capable of filling (3) its own connectivity information to a service portal of the third party service provider (SP) that is linked to the uniform resource identifier appearing on mobile device's tag. After this, the mobile device (MD) is configured to approach (4) the first stationary device (F1) in order to read the first stationary device's tag comprising the connection information for the first stationary device (F1). The mobile device (MD) is capable of filling (5) the connection information of the first stationary device (F1) to the service portal of the third party service provider (SP) being linked to mobile device's tag. After this, the second stationary device (F2) is capable of noticing (6) that the pairing partner information is being input to said service portal, whereby the second stationary device (F2) is capable of initializing the connection (7) with the first stationary device (F1). This embodiment is also illustrated in FIG. 9

An Embodiment for Mobile Device's Configuration

Figure 10:
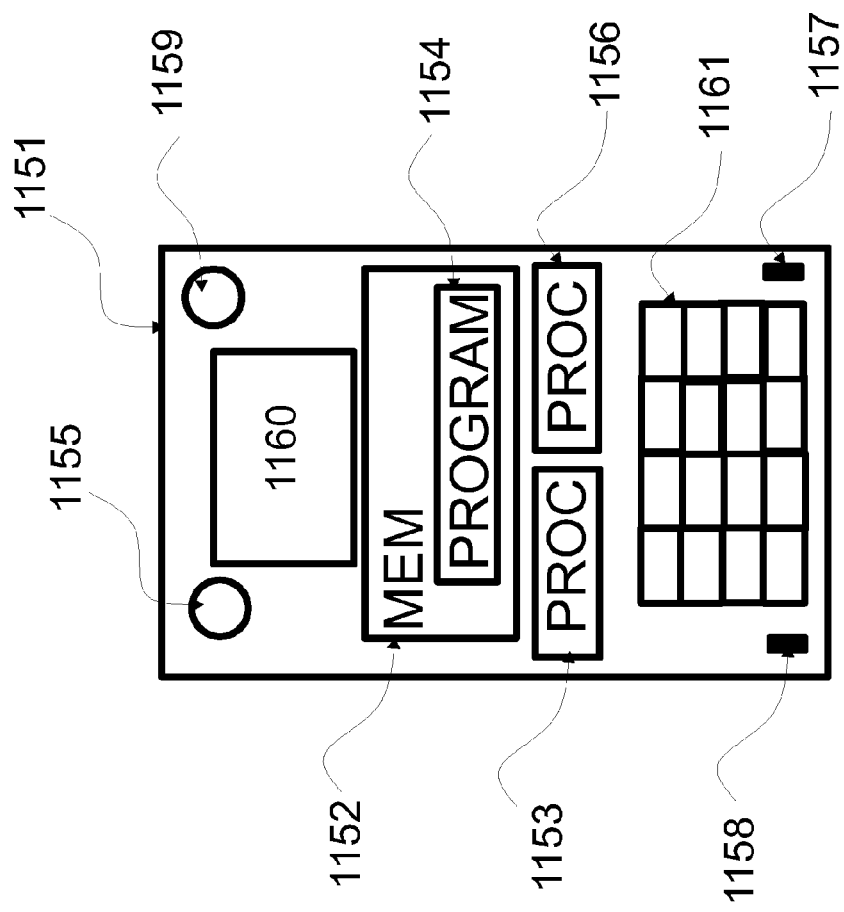
FIG. 10 illustrates an example of a configuration of a mobile device.

FIG. 10 shows an apparatus according to an example embodiment. As shown in FIG. 10, the apparatus 1151 contains memory 1152, at least one processor 1153 and 1156, and computer program code 1154 residing in the memory 1152. The apparatus may also have one or more cameras 1155 and 1159 for capturing image data, for example stereo video. The apparatus may also contain one, two or more microphones 1157 and 1158 for capturing sound. The apparatus may also comprise a display 1160. The apparatus 1151 may also comprise an interface means (e.g., a user Interface) which may allow a user to interact with the device. The user interface means may be implemented using a display 1160, a keypad 1161, voice control, or other structures. The apparatus may also be connected to another device e.g. by means of a communication block (not shown in FIG. 10) able to receive and/or transmit information. It needs to be understood that different embodiments of the apparatus allow different parts to be carried out in different elements.

An example of a user interface that enables the user to use the mobile device (as an example of an apparatus) for controlling pairing is disclosed next. It is appreciated that the user interface may vary according to different embodiments. In general, the user interface can be either a standalone application a system application.

Standalone Application

If the user interface is a standalone application, and the mobile device is an initiator (as in the first embodiment, FIGS. 2 and 6), the mobile device may be configured to show the user interface only when the user opens the application. Right after opening, the mobile device can start checking whether there are other near field communication devices nearby.

When a mobile device is a target (as in the second embodiment, FIGS. 3 and 7), similarly, the mobile device is configured to show the user interface only when the user opens the application. However, in this situation, the user interface is configured to allow other devices to modify the tag information.

When a mobile device acts as an initiator and a target (as in the third embodiment, FIGS. 4 and 8), again the mobile device is configured to show the user interface only when the user opens the application. Right after the opening, the mobile device is configured to start checking whether there are near field communication devices nearby. If the service provider is involved (as in the fourth embodiment, FIGS. 5 and 9), then mobile device is configured to check—after having opened the application—whether there has a pairing partner information been input into the service provider.

System Application

If the user interface is a system application, and a mobile device is an initiator (as in the first embodiment, FIGS. 2 and 5), the mobile device is configured to start the application user interface whenever the near field communication is enabled and connection request related information is read from the near field communication target.

It is also possible that in an embodiment, where a mobile device is a target (as in the second embodiment, FIGS. 3 and 7), the mobile device can receive a notification to enable the system application to allow another device to modify the tag information.

When a mobile device acts as an initiator and a target (as in the third embodiment, FIGS. 4 and 7), the mobile device is configured to start the application user interface whenever the near field communication is enabled and connection request related information is read from a near field communication target.

In addition, to the above examples on the user interface, the mobile device can be incorporated with additional intelligence to automatically share the configuration settings once it comes in close proximity with the stationary device. This however may expect that the tag holding connection information in the approached device has an indicator in the tag information (e.g. a prefix), whereby the mobile device can assume that the approached device needs to be connected.

In the first and the third embodiments (FIGS. 2 and 5; FIGS. 4 and 7), the mobile device already holds one uniform resource identifier. Because of that, the mobile device should assume that the user is going to connect with another device, whereby the current timeout is used to disable near field communication. Also, once near field communication is reopened, the assumption still stands if no newer settings are received (or amount exceeds the limit of holding settings), or if the settings are not mixed, or if the time out for connection is not expired.

Optionally, the connection setting manager can be implemented as a user interface to manage which settings to share with which terminal in the first and the third embodiment. In the second embodiment, the tag can be rewritten according to the selection from setting management user interface.

In above, embodiments for using an apparatus for controlling pairing of two devices have been disclosed. The different embodiments may be implemented as software running on the apparatus, such as a mobile device, and optionally on services. The apparatus can also be (for example in the second embodiment) simply a tag or a tool (a keyring, a ring, a glove or any handy tool) comprising such a tag. The apparatus (such as a mobile device) may be equipped at least with a memory, processor, display, keypad, motion detector hardware, and communication means such as 2G, 3G, WLAN, or other. The apparatus may have hardware like a touch screen (single-touch or multi-touch) and means for positioning like network positioning or a global positioning system (GPS) module. There may be various applications on the apparatuses such as a calendar application, a contacts application, a map application, a messaging application, a browser application, a gallery application, a video player application and various other applications for office and/or private use.

The various embodiments of the invention can be implemented with the help of computer program code that resides in a memory and causes the relevant apparatuses to carry out various embodiments of the present invention. For example, a mobile device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment. The various devices may be or may comprise encoders, decoders and transcoders, packetizers and depacketizers, and transmitters and receivers.

The present invention is not limited solely to the above-presented embodiments, but it can be modified within the scope of the appended claims.

The invention claimed is:

1. A method comprising:
    setting a first short range communication path between an apparatus and a first fixed device, which first short range communication path is used for delivering a first pairing information enabling a connection between the first fixed device and a second fixed device, wherein the apparatus is embodied by a mobile device;
    setting a second short range communication path between the apparatus and the second fixed device, which second short range communication path is used for delivering a second pairing information enabling a connection between the first fixed device and the second fixed device,
    wherein the first and second pairing information is used for setting the connection between the first fixed device and the second fixed device, and
    the first and second pairing information comprises a tag holding a uniform resource identifier, wherein the tag enables the pairing of the first and second fixed devices and the mobile device is configured to modify the tag to indicate at least one connection request with the uniform resource identifier.

2. The method according to claim 1, further comprising reading the first pairing information via the first short range communication path from the first fixed device by means of the apparatus.

3. The method according to claim 1, further comprises delivering the first pairing information via the first short range communication path to a service provider by means of the first fixed device.

4. The method according to claim 1, further comprising reading the second pairing information via the second short range communication path from the second fixed device by means of the apparatus.

5. The method according to claim 4, further comprising delivering the second pairing information via the second short range communication to the service provider by means of the second fixed device.

6. The method according to claim 4, further comprising reading the second pairing information via the first short range communication path from the apparatus by means of the second fixed device.

7. The method according to claim 1, wherein the first and second fixed devices are stationary devices.

8. The method according to claim 1, wherein the short range communication path is a near field communication path.

9. A system comprising:
    an apparatus embodied by a mobile device;
    a first fixed device and a second fixed device;
    wherein the apparatus is configured to set a first short range communication path between the apparatus and the first fixed device, which first short range commu-
nication path is used for delivering a first pairing information enabling a connection between the first fixed device and the second fixed device;
    wherein the apparatus is also configured to set a second short range communication path between the apparatus and the second fixed device, which second short range communication path is used for delivering a second pairing information enabling a connection between the first fixed device and the second fixed device;
    wherein the apparatus is further configured to use the first and second pairing information for setting the connection between the first fixed device and the second fixed device, and
    the first and second pairing information comprises a tag holding a uniform resource identifier, wherein the tag enables the pairing of the first and second fixed devices and the mobile device is configured to modify the tag to indicate at least one connection request with the uniform resource identifier.

10. An apparatus comprising at least one processor, and non-transitory memory including computer program code, the memory and the computer program code configured to, with the at least one processor, cause the apparatus to at least:
    set a first short range communication path between the apparatus and a first fixed device, which first short range communication path is used for delivering a first pairing information enabling a connection between the first fixed device and a second fixed device, wherein the apparatus is embodied by a mobile device;
    set a second short range communication path between the apparatus and the second fixed device, which second short range communication path is used for delivering a second pairing information enabling a connection between the first fixed device and the second fixed device, and
    the first and second pairing information comprises a tag holding a uniform resource identifier, wherein the tag enables the pairing of the first and second fixed devices and the mobile device is configured to modify the tag to indicate at least one connection request with the uniform resource identifier.

11. The apparatus according to claim 10, wherein the apparatus is configured to read the first pairing information via the first short range communication path from the first fixed device.

12. The apparatus according to claim 10, wherein the apparatus is configured to read the second pairing information via the second short range communication path from the second fixed device.

13. The apparatus according to claim 10, wherein the memory and the computer program code are configured to, with the at least one processor, further cause the apparatus to store at least one of the first or second pairing information.

14. A device comprising at least one processor, and non-transitory memory including computer program code, the memory and the computer program code configured to, with the at least one processor, cause the device to at least:
    establish a short range communication path to an apparatus for receiving a pairing information enabling a connection to another fixed device; and
    setting up a connection to the another fixed device by using the pairing information, wherein the pairing information comprises a tag holding a uniform resource identifier, wherein the tag enables the pairing of the device and the another fixed device and the apparatus is configured to modify the tag to indicate at least one connection request with the uniform resource identifier.

15. The device according to claim 14, being configured to store a pairing information for the device.

16. The device according to claim 14, wherein the device is configured to read a pairing information enabling a connection to another fixed device from an apparatus.

17. The device according to claim 14, wherein the device is a stationary device.

18. The device according to claim 14, wherein the short range communication path is a near field communication path.

19. A computer program embodied on a non-transitory computer readable medium, the computer program comprising instructions causing, when executed on at least one processor, at least one apparatus to:

set a first short range communication path between the apparatus and a first fixed device, which first short range communication path is used for delivering a first pairing information enabling a connection between the first fixed device and a second fixed device, wherein the apparatus is embodied by a mobile device;

set a second short range communication path between the apparatus and the second fixed device, which second short range communication path is used for delivering a second pairing information enabling a connection between the first fixed device and the second fixed device;

wherein the instructions are configured to further cause the apparatus to use the first and second pairing information for setting the connection between the first fixed device and the second fixed device, and the first and second pairing information comprises a tag holding a uniform resource identifier, wherein the tag enables the pairing of the first and second fixed devices and the mobile device is configured to modify the tag to indicate at least one connection request with the uniform resource identifier.

20. The computer program according to claim 19, wherein the short range communication path is a near field communication path.

* * * * *

UNITED STATES PATENT AND TRADEMARK OFFICE
CERTIFICATE OF CORRECTION

Page 1 of 1

PATENT NO.       : 9,621,231 B2
APPLICATION NO.  : 14/241060
DATED            : April 11, 2017
INVENTOR(S)      : Wenhui Lu It is certified that error appears in the above-identified patent and that said Letters Patent is hereby corrected as shown below:

On the Title Page

Item (54), and in the Specification, Column 1, Line 3, in "Title", "DEVICE" should read --DEVICES--.

Signed and Sealed this
Second Day of January, 2018

Joseph Matal
*Performing the Functions and Duties of the*
*Under Secretary of Commerce for Intellectual Property and*
*Director of the United States Patent and Trademark Office*